United States Patent
Uttaro et al.

(10) Patent No.: US 9,088,498 B2
(45) Date of Patent: *Jul. 21, 2015

(54) COMMUNICATION NETWORKS THAT PROVIDE A COMMON TRANSPORT DOMAIN FOR USE BY MULTIPLE SERVICE DOMAINS AND METHODS AND COMPUTER PROGRAM PRODUCTS FOR USING THE SAME

(71) Applicant: AT&T Intellectual Property I, L.P., Atlanta, GA (US)

(72) Inventors: James Uttaro, Staten Island, NY (US); Richard Todd Harding, Athens, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,279

(22) Filed: Jun. 3, 2014

(65) Prior Publication Data

US 2014/0269730 A1    Sep. 18, 2014

Related U.S. Application Data

(63) Continuation of application No. 12/640,943, filed on Dec. 17, 2009, now Pat. No. 8,761,185.

(51) Int. Cl.
| | |
|---|---|
| *H04L 12/721* | (2013.01) |
| *H04L 12/715* | (2013.01) |
| *H04L 12/723* | (2013.01) |
| *H04L 12/66* | (2006.01) |
| *H04L 12/70* | (2013.01) |

(52) U.S. Cl.
CPC ............... *H04L 45/12* (2013.01); *H04L 12/66* (2013.01); *H04L 45/04* (2013.01); *H04L 45/50* (2013.01); *H04L 45/72* (2013.01); *H04L 2012/5618* (2013.01)

(58) Field of Classification Search
CPC ......... H04L 12/56; H04L 12/66; H04L 12/70; H04L 2012/5618
USPC ...................... 370/395.31, 401; 709/239, 242
See application file for complete search history.

(56) References Cited

U.S. PATENT DOCUMENTS

| | | | |
|---|---|---|---|
| 2006/0041682 A1* | 2/2006 | Johnson et al. ............... | 709/242 |
| 2007/0112975 A1* | 5/2007 | Cassar .......................... | 709/239 |
| 2007/0214280 A1* | 9/2007 | Patel et al. .................... | 709/239 |
| 2011/0228785 A1* | 9/2011 | Filsfils et al. ............. | 370/395.31 |

\* cited by examiner

*Primary Examiner* — Wanda Z Russell
(74) *Attorney, Agent, or Firm* — Myers Bigel Sibley & Sajovec, PA

(57) ABSTRACT

A method of operating a communication network comprises receiving loopback addresses from a plurality of edge networks at a provider router of a core backbone network, the edge networks and the core backbone network being logically distinct from each other, advertising the loopback addresses to a transport route reflector element, propagating the advertisement of the loopback addresses to other provider routers of the core backbone network using a protocol for communicating between autonomous systems, and using the transport route reflector element to advertise at least one of the loopback addresses to a service route reflector element in one of the plurality of edge networks.

18 Claims, 6 Drawing Sheets

Data # COMMUNICATION NETWORKS THAT PROVIDE A COMMON TRANSPORT DOMAIN FOR USE BY MULTIPLE SERVICE DOMAINS AND METHODS AND COMPUTER PROGRAM PRODUCTS FOR USING THE SAME

RELATED APPLICATION

This application is a continuation of U.S. application Ser. No. 12/640,943, filed Dec. 17, 2009, the disclosure of which is hereby incorporated herein by reference as if set forth in its entirety.

BACKGROUND

The present disclosure relates generally to communication networks, and, more particularly, to methods, systems, and computer program products for providing a common transport domain for use by multiple service domains by divorcing the distribution of loopback addresses for node reachability in the network from the signaling of the particular service.

Some Interior Gateway Protocols (IGPs), such as Open Shortest Path First (OSPF), allow an Autonomous System (AS) network, for example, to be partitioned into multiple areas to improve routing scalability within particular routing domains. Networks that use Multiprotocol Label Switching (MPLS) for routing, such as Virtual Private LAN Service (VPLS) networks, are required by the MPLS Label Distribution Protocol (LDP) to distribute loopback addresses for all Label Edge Routers (LERs) across all of the OSPF areas. Unfortunately, the deployment of a service that requires a large footprint of Provider Edges (PEs) may require many non-zero AS areas to be defined. For example, implementation of a VPLS service may create many non-zero areas that are aligned with the specific metro area that a set of PEs are deployed in. As a result, the number of routers and Label Switch Paths (LSPs) may grow rapidly, possibly to the point that it may be difficult to scale the OSPF core backbone area zero to support all of the non-zero areas.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method of operating a communication network comprising receiving loopback addresses from a plurality of edge networks at a provider router of a core backbone network, the edge networks and the core backbone network being logically distinct from each other, advertising the loopback addresses to a transport route reflector element, propagating the advertisement of the loopback addresses to other provider routers of the core backbone network using a protocol for communicating between autonomous systems, and using the transport route reflector element to advertise at least one of the loopback addresses to a service route reflector element in one of the plurality of edge networks.

In other embodiments, the loopback addresses comprise Multi-Protocol Label Switching (MPLS) loopback addresses for labeled traffic and loopback addresses for non-labeled traffic.

In still other embodiments, advertising the loopback addresses comprises assigning labels to the MPLS loopback addresses, respectively, and advertising the labeled MPLS loopback addresses to the route reflector element.

In still other embodiments, advertising the loopback addresses comprises advertising the loopback addresses for non-labeled traffic using an Open Systems Interconnection (OSI) reference model layer three protocol.

In still other embodiments, the core backbone network and the plurality of edge networks are each distinct autonomous systems.

In still other embodiments, the core backbone network and the edge network are configured to use an Interior Gateway Protocol (IGP) to communicate with one another.

In still other embodiments, the IGP comprises an Open Shortest Path First (OSPF) routing protocol.

In still other embodiments, the core backbone network comprises area zero of the OSPF routing domain and the edge networks comprise non-zero areas of the OSPF routing domain.

In still other embodiments, the protocol for communicating between autonomous systems comprises a Border Gateway Protocol (BGP).

In still other embodiments, the loopback addresses have BGP communities attribute tags associated therewith.

In still other embodiments, propagating the advertisement of the loopback addresses to other provider routers of the core backbone network is based on the BGP communities attribute tags associated with the loopback addresses.

In still other embodiments, using the transport route reflector element to advertise at least one of the loopback addresses to the service route reflector element in one of the plurality of edge networks is based on BGP communities attribute tags associated with the loopback addresses and the service.

In still other embodiments, the loopback addresses comprise Multi-Protocol Label Switching (MPLS) loopback addresses for labeled traffic and loopback addresses for non-labeled traffic and at least one of the loopback addresses advertised to the service route reflect element comprises at least one of the loopback addresses for non-labeled traffic.

In still other embodiments, using the transport route reflector element to advertise at least one of the loopback addresses to the service route reflector element in one of the plurality of edge networks comprises using Border Gateway Protocol (BGP) to advertise at least one of the loopback addresses to the service route reflector element.

In still other embodiments, the core backbone network and the plurality of edge networks use Multi-Protocol Label Switching (MPLS) as a routing protocol and using the transport route reflector element to advertise at least one of the loopback addresses to the service route reflector element in one of the plurality of edge networks comprises communicating each of the at least one of the loopback addresses to the service route reflect element as Next Hop Unchanged.

In still other embodiments, the core backbone network uses Multi-Protocol Label Switching (MPLS) as a routing protocol. The method further comprises receiving an advertisement of a loopback address associated with the service route reflector element at the transport route reflector element and propagating the advertisement of the loopback address associated with the service route reflector element to the other provider routers of the core backbone network as Next Hope Unchanged using BGP.

In still other embodiments, propagating the advertisement of the loopback address associated with the service route reflector element to the other provider routers of the core backbone is based on the BGP communities attribute tags associated with the loopback address associated with the service route reflector element.

In still other embodiments, the service comprises at least one of Virtual Private LAN Service (VPLS) and Virtual Private Network (VPN).

In further embodiments, a communication network comprises a provider router in a core backbone network that is configured to receive loopback addresses from a plurality of edge networks, the edge networks and the core backbone network being logically distinct from each other, and to advertise the loopback addresses and a transport route reflector element that is configured to receive the advertisement of the loopback addresses and to propagate the advertisement of the loopback addresses to other provider routers of the core backbone network using a protocol for communicating between autonomous systems and to advertise at least one of the loopback addresses to a service route reflector element in one of the plurality of edge networks.

In other embodiments, a computer program product for operating a communication network comprises a computer readable storage medium having computer readable program code embodied therein. The computer readable program code comprises computer readable program code configured to receive loopback addresses from a plurality of edge networks at a provider router of a core backbone network, the edge networks and the core backbone network being logically distinct from each other, computer readable program code configured to advertise the loopback addresses to a transport route reflector element, computer readable program code configured to propagate the advertisement of the loopback addresses to other provider routers of the core backbone network using a protocol for communicating between autonomous systems, and computer readable program code configured to use the transport route reflector element to advertise at least one of the loopback addresses to a service route reflector element in one of the plurality of edge networks.

Other methods, systems, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
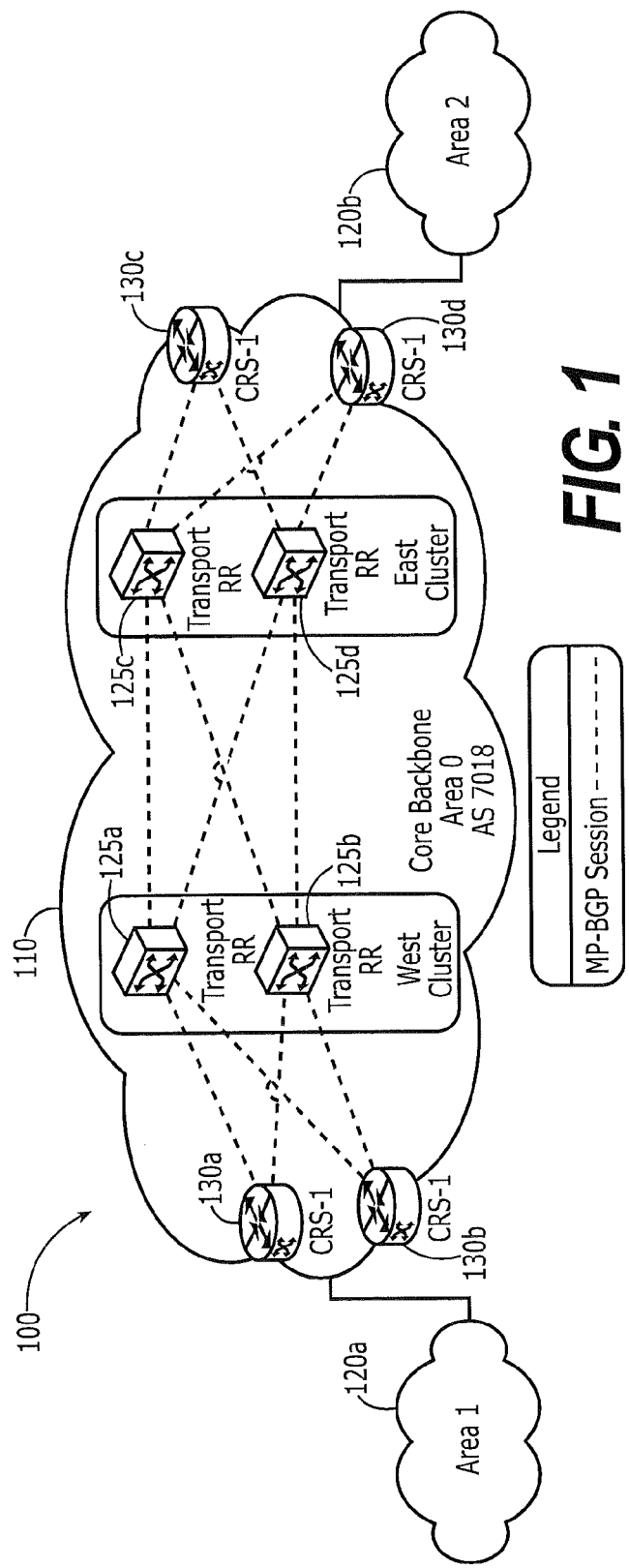
FIG. 1 is a block diagram that illustrates a communication network that includes a core backbone network for use in distributing loopback addresses according to some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, microcode, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

According to some embodiments, loopback addresses of network elements located in edge networks of larger communication networks may be distributed across the elements of a core backbone network without those loopback addresses appearing in the Interior Gateway Protocol (IGP) routing tables of the provider routers within the core backbone network. In particular, some embodiments use a protocol for communicating between autonomous systems, such as the Border Gateway Protocol (BGP), to carry loopback addresses from an edge network, across the core backbone network, and to a destination edge network. In communication networks that use Multiprotocol Label Switching (MPLS) for routing, the distribution of loopback addresses may be carried out using the address space associated with the combination of BGP with an MPLS label. Thus, the core backbone network may be viewed as a transport autonomous system for use in distributing loopback addresses for reachability purposes. This may allow other edge network domains to operate as service autonomous system domains where the loopback address distribution is separated from the signaling associated with the service itself. Such an approach may allow for better control over route propagation and signaling as well as improvements in overall scalability.

FIG. 1 illustrates an exemplary communication network 100, according to some embodiments, in which a core backbone area zero 110 is connected to two non-zero edge areas 120a and 120b. Although illustrated as a core area zero 110 with two non-zero edge areas 120a and 120b, it will be understood that the embodiments described herein are not limited to such a configuration. A core backbone network and associated edge networks may be configured as part of a single Autonomous System (AS), but as separate areas, such as, for example, when Open Shortest Path First (OSPF) is used as an Interior Gateway Protocol (IGP). In other embodiments, the core backbone network and associated edge networks may be configured to be separate ASes. Accordingly, in general, the core backbone network and each edge network are configured to be logically distinct from one another.

Some embodiments will now be described by way of example with reference to FIG. 1. In the FIG. 1 example, the core backbone area zero 110 may be implemented as a BGP transport AS. The core backbone area zero 110 includes two clusters of transport route reflector elements 125a, 125b, 125c, and 125d. Route reflectors are used in BGP to act as a focal point for internal BGP sessions. Multiple BGP routers can peer with a route reflector as a central point rather than peer with every other router in a full mesh. The route reflector elements 125a, 125b, 125c, and 125d facilitate the distribution of loopback addresses from the edge areas 120a and 120b across the cross the core backbone area zero 110 and to destination edge areas. The route reflector elements 125a, 125b, 125c, and 125d may carry both Loopback0 and Loopback10 addresses. Loopback0 addresses are used for non-MPLS labeled traffic and Loopback10 addresses are used for MPLS labeled traffic. While customer traffic is typically labeled in communication networks using MPLS, some traffic may be non-labeled, such as network management traffic and control plane functions. As a result, the route reflector elements 125a, 125b, 125c, and 125d may support the Internet Protocol (IP) address space, such as IPv4 or IPv6, along with the address space based on a combination of BGP with an MPLS label.

In the example shown in FIG. 1, route reflector elements 125a and 125b are dedicated to the western portion of the U.S. while route reflector elements 125c and 125d are dedicated to the eastern portion of the U.S. The four route reflector elements 125a, 125b, 125c, and 125d may be configured to disseminating both BGP/MPLS label routes along with IP, e.g., IPv4 routes. A route reflector in a given cluster is configured to have a multiprotocol internal BGP (MP-iBGP) session with each of the route reflectors in the other cluster.

The provider routers (P routers) 130a, 130b, 130c, and 130d are configured to act as AS boundary routers to the respective edge areas 120a and 120b and will each have an MP-iBGP session to each of the route reflectors in the cluster to which the particular P router is homed. Not all P routers in the core backbone area zero 110 need to establish the MP-iBGP session because not all P routers will have edge areas subtending them.

Each P router has a MP-iBGP session to both transport route reflectors in the cluster for resiliency purposes. If one of the sessions fails for whatever reason, the other route reflector in the cluster still has access to all of the routes that are being disseminated. The BGP table of the P router holds both sets of routes it receives from the two route reflectors. If a failure occurs with one of the two sessions, then the Cisco Express Forwarding (CEF) table, and subsequently the Forwarding Information Base (FIB), is updated. This generally should not have any impact on the packets being forwarded.

Figure 2:
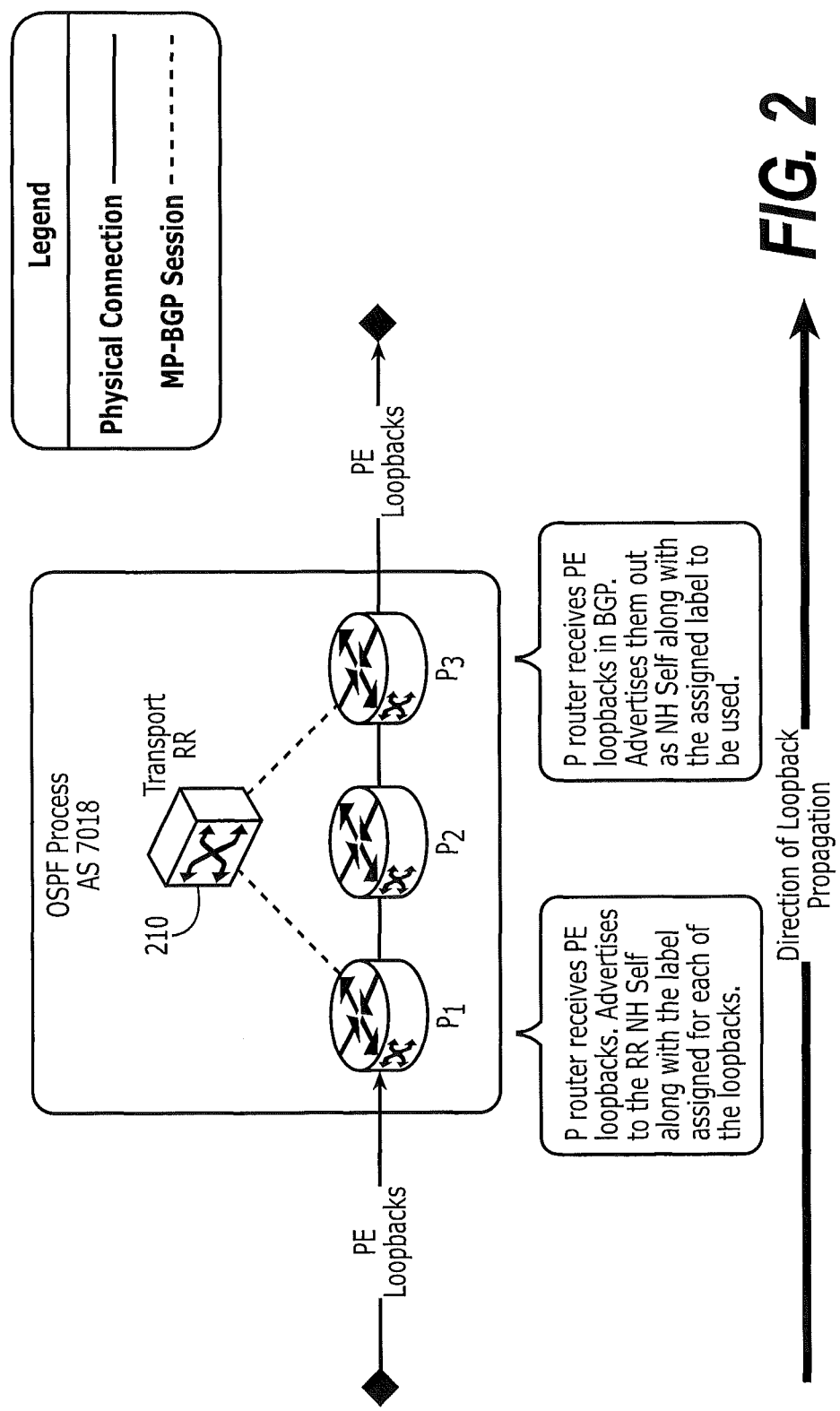
FIG. 2 is a block diagram that illustrates operations of the route reflector element of FIG. 1.

Operations for distributing loopback address information via a common transport domain, such as the core backbone area zero 110 of FIG. 1, will now be described with reference to the network block diagram of FIG. 2 and the flowchart of FIG. 3. At block 300 of FIG. 3, one or more P routers receive loopback addresses from one or more edge networks (e.g., areas 120a and 120b of FIG. 1). The P router(s) will have the edge loopback addresses in its BGP routing tables. This may happen by, for example, a P router peering with an edge BGP speaker or by redistributing routes into BGP. In some embodiments, the loopback addresses have BGP communities attribute tags associated therewith which can be used as a basis for controlling the propagation and distribution of the loopback addresses throughout the network. As shown in the example of FIG. 2, loopback addresses arrive into the P1 router table. These loopback addresses may include Loopback10 addresses so the P1 router assigns labels to the addresses and, at block 310 of FIG. 3, advertises the loopback addresses and their labels to the transport route reflector 210 using the BGP plus MPLS label address space. The P1 router does not assign any label to Loopback0 addresses and may advertise the non-labeled loopback addresses to the transport route reflector 210 using, for example, an IPv4 unicast. The P1 router is advertised as being the Next Hop (NH) for both Loopback0 and Loopback10 addresses.

Figure 3:
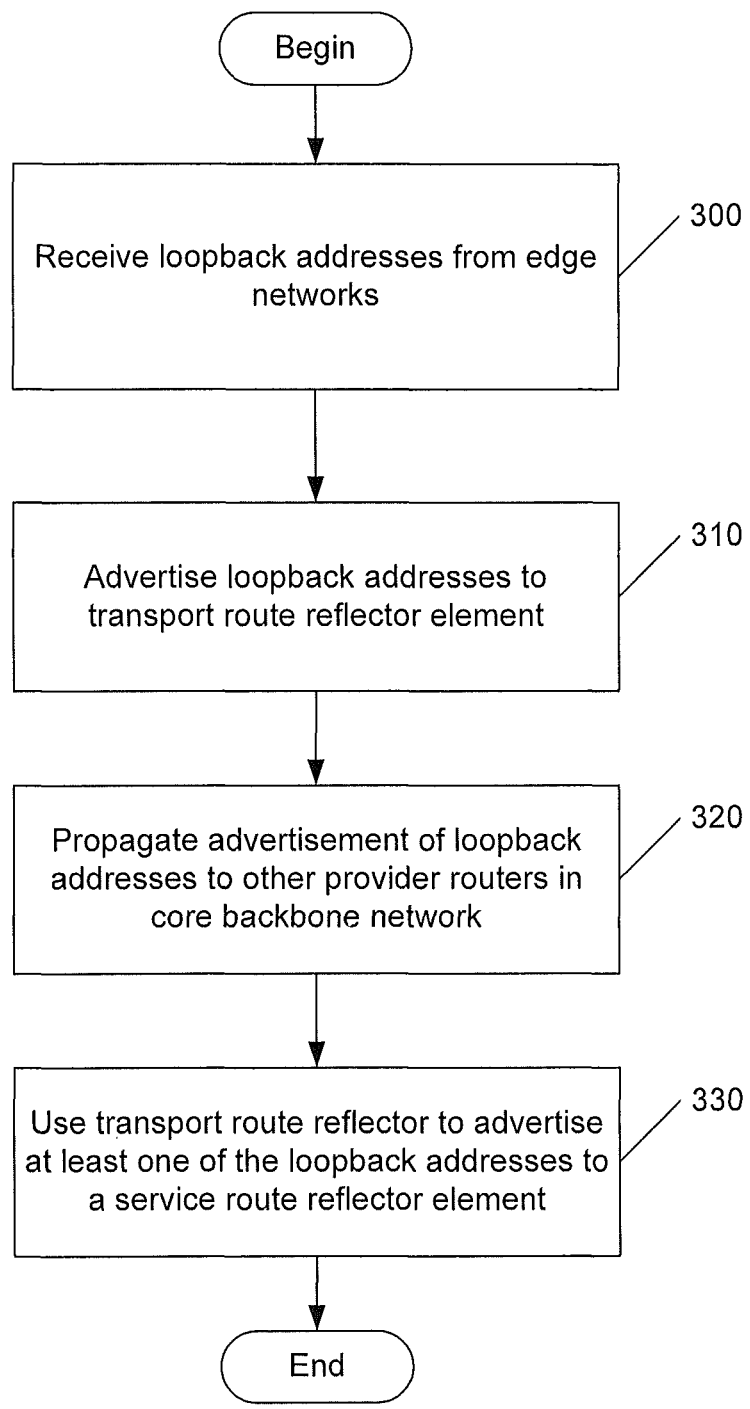
FIG. 3 is a flowchart that illustrates operations for using a common transport domain by one or more service domains in accordance with some embodiments.

At block 320, the loopback address route advertisement is propagated to other P routers in the core backbone network that have a BGP session with the route reflector 210, which is the P3 router in FIG. 3. In further embodiments, P routers may advertise the loopback addresses to destination edge networks as appropriate.

Figure 4:
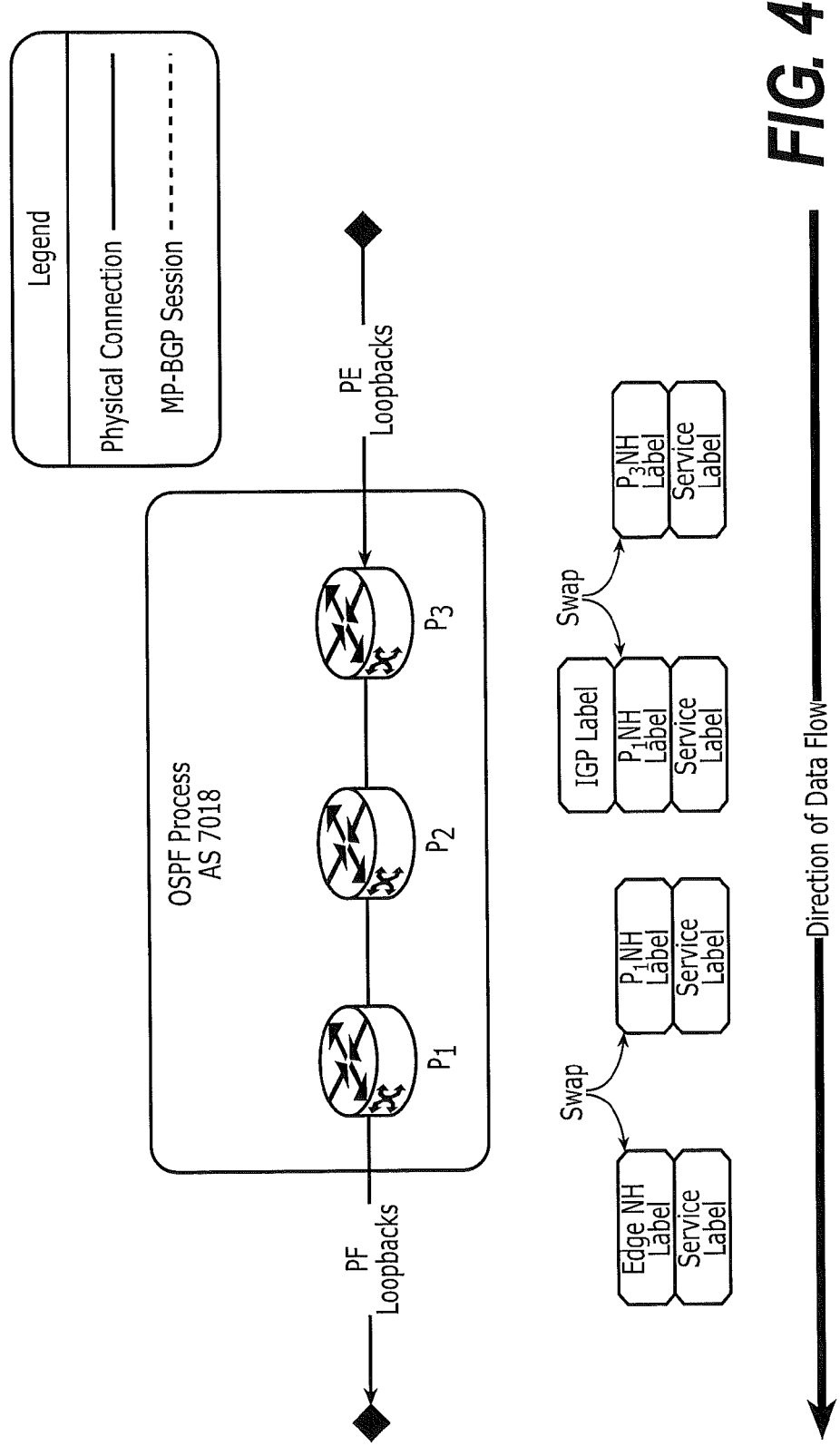
FIG. 4 is a block diagram that illustrates Multiprotocol Label Switching (MPLS) label construction in communication networks according to some embodiments.

FIG. 4 illustrates examples of label construction in a common transport domain, such as the core backbone area zero 110 of FIG. 1 according to some embodiments. As data arrives at the P3 router from an edge network/area, the bottom of the label stack includes the Service Label. An example of this label is the VPLS label signaled for a particular customer.

On top of that label is the label that is used to get to P3. This label is present if P3 advertised itself as the Next Hop for that destination Provider Edge (PE) router into its locally connected edge area. The P3 router will see the incoming top label and know that it needs to swap the incoming label with the label it learned as being the NH. After swapping the labels, P3 will add the IGP label. The IGP label is the LDP learned label that P3 will use to send traffic to P1.

Assuming that the P2 is the penultimate hop, as shown in FIG. 4, P2 will pop the top label and pass the packet on to P1. P1 will then see the top label as being the label that it advertised out. It will then perform a swap for the label that it knows is the label needed to continue sending the packet into the edge area.

As discussed above, the core backbone network may be viewed as a transport autonomous system for use in distributing loopback addresses for reachability purposes. This may allow other edge network domains to operate as effectively service AS domains where the loopback address distribution is separated from the signaling associated with the service itself. Various types of services may make use of common transport domain, such as the core backbone area zero 110 of FIG. 1, including, but not limited to, Virtual Private LAN Service (VPLS) and Virtual Private Network services.

Figure 5:
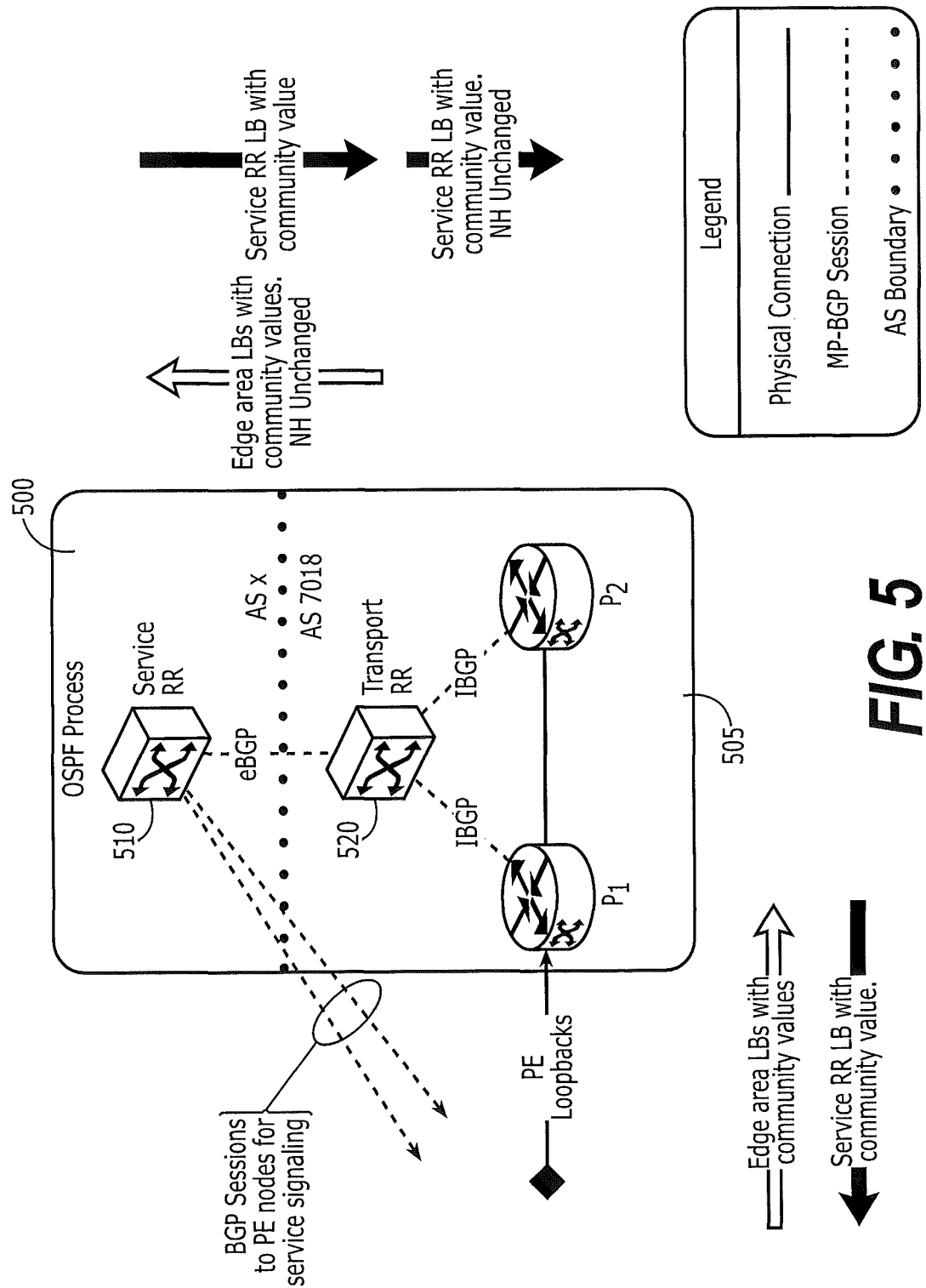
FIG. 5 is a block diagram that illustrates operations service domains and transport domains according to some embodiments.

FIG. 5 illustrates the relationship between a service domain 500 and a common transport domain 505. In particular, the service domain 500 includes at least one service route reflector 510 and the common transport domain 505 includes at least one transport route reflector 520 as discussed above. Because the edge loopback addresses are in the BGP routing tables in the common transport domain 505, the service route reflector 510 uses BGP to acquire the ability to reach these routing nodes. Thus, the service route reflector 510 is shown to have a peer relationship with the transport route reflector 520 using external BGP. Referring back to the flowchart of FIG. 3, at block 330, the transport route reflector 520 advertise one or more of the loopback addresses to the service route reflector 510.

Because the transport route reflector 520 could potentially be used to provide reachability for different services, the advertisement of routes to a particular service route reflector may be based on BGP communities attribute tags associated with that particular service in some embodiments. The transport route reflector 520 only needs to advertise the Loopback0 addresses of the PE devices to the service route reflector 510 in some embodiments, as it is not expected that labeled traffic will be sent from the service route reflector 510 to the PE devices in the edge networks/areas.

When the transport route reflector 520 advertises the edge loopback addresses to the service route reflector 510, they may be communicated as Next Hop Unchanged. The service route reflector 510 needs to know that the "edge" P router is the next hop to get to the edge PE nodes. The service route reflector 510 knows how to get to the P router next hop because they both reside in the same IGP domain.

The edge area devices may likewise need to know how to get to the service route reflector 510. The particular manner in which this is done may depend upon the way in which the edge networks/areas interface with the core backbone network in accordance with various embodiments. Knowing that one of the options will be external BGP, the PE devices may learn about the service route reflector 510 via BGP.

In some embodiments, the service route reflector 510 advertises its Loopback0 address to the transport route reflector 520. The transport route reflector 520 advertises the loopback address and Next Hop Unchanged to the P routers with which it has a BGP relationship. The P router then advertises it into the edge network/area with the P router's loopback now being the next hop. Again, this route propagation may be based on may be based on BGP communities attribute tags associated with the service route reflector's 510 loopback address.

Although FIGS. 1, 2, 4, and 5 illustrates exemplary communication networks according to some embodiments, it will be understood that the present invention is not limited to such configurations, but is intended to encompass any configuration capable of carrying out the operations described herein.

Although FIG. 1 illustrates an exemplary communication network, it will be understood that the present invention is not limited to such configurations, but is intended to encompass any configuration capable of carrying out the operations described herein.

Figure 6:
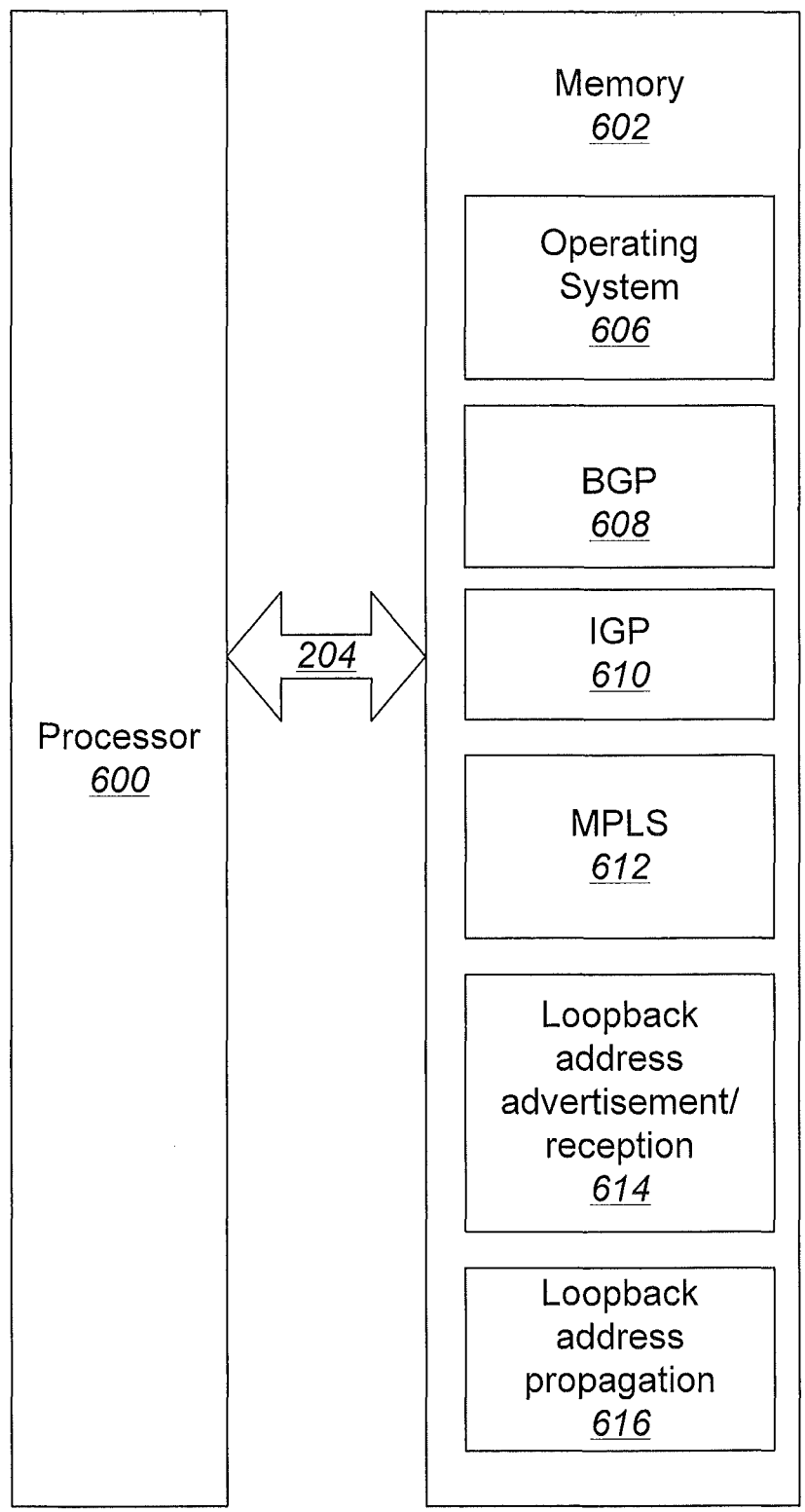
FIG. 6 is a block diagram that illustrates a software/hardware architecture for network elements that are configured to distribute loopback addresses in a communication network according to some embodiments.

FIG. 6 illustrates a processor 600 and memory 602 that may be used in embodiments of transport route reflectors, service route reflectors, and/or P routers as described above. The processor 600 communicates with the memory 602 via an address/data bus 604. The processor 600 may be, for example, a commercially available or custom microprocessor. The memory 602 is representative of the one or more memory devices containing the software and data used to mitigate email address harvest attacks and associated spam attacks in accordance with some embodiments. The memory 602 may include, but is not limited to, the following types of devices: cache, ROM, PROM, EPROM, EEPROM, flash, SRAM, and DRAM.

As shown in FIG. 6, the memory 602 may contain up to five or more categories of software and/or data: an operating system(s) 606, a BGP module 608, an IGP module 610, an MPLS module 612, a loopback address advertisement/reception module 614, and a loopback address propagation module 616. The operating system 606 generally controls the operation of the data processing system. In particular, the operating system 606 may manage the data processing system's software and/or hardware resources and may coordinate execution of programs by the processor 600. The BGP module 608, IGP module 610, and MPLS module 612 may be configured to carry out the operations associated with the respective communication protocols. The loopback address advertisement/reception module 614 may be configured to advertise and/or receive loopback addresses with other network elements, such as routers, devices, and the like. The loopback address propagation module 616 may be configured to cooperate with the other communication protocol modules (608, 610, and 612) to manage the propagation of loopback addresses between edge networks and a core backbone transport network as described above. It will be understood that the various network elements, such as the transport route reflectors, service route reflectors, P routers, etc., may be configured with various ones of the modules 608, 610, 612, 614, and 616 in accordance with different embodiments.

Although FIG. 6 illustrates exemplary hardware/software architectures that may be used in network elements, such as the transport route reflectors, service route reflectors, P routers, etc described above, it will be understood that the present invention is not limited to such a configuration but is intended to encompass any configuration capable of carrying out operations described herein. Moreover, the functionality of the hardware/software architecture of FIG. 6 may be implemented as a single processor system, a multi-processor system, or even a network of stand-alone computer systems, in accordance with various embodiments of the present invention.

Computer program code for carrying out operations of data processing systems discussed above with respect to FIGS. 1 and 2 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments have been described herein with reference to flowchart and/or block diagram illustrations of methods, systems, and computer program products in accordance with exemplary embodiments. These flowchart and/or block diagrams further illustrate exemplary operations for mitigating email address harvest attacks and associated spam attacks, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Many variations and modifications can be made to the preferred embodiments without substantially departing from the principles of the present invention. All such variations and modifications are intended to be included herein within the scope of the present invention, as set forth in the following claims.

That which is claimed:

1. A method, comprising:
   receiving loopback addresses from a plurality of edge networks at a provider router of a core backbone network, the edge networks and the core backbone network being logically distinct from each other;
   advertising the loopback addresses to a transport route reflector element;
   propagating the advertisement of the loopback addresses to other provider routers of the core backbone network using a protocol for communicating between autonomous systems; and
   using the transport route reflector element to advertise one of the loopback addresses to a service route reflector element in one of the plurality of edge networks;
   wherein the loopback addresses are not included in routing tables used by an interior gateway protocol for communication within the core backbone network;
   wherein the core backbone network and the edge network communicate with one another using the interior gateway protocol; and
   wherein the autonomous systems communicate using a border gateway protocol.

2. The method of claim 1, wherein the loopback addresses comprise multi-protocol label switching loopback addresses for labeled traffic and loopback addresses for non-labeled traffic.

3. The method of claim 2, wherein advertising the loopback addresses comprises:
   assigning labels to the multi-protocol label switching loopback addresses, respectively; and
   advertising the labeled multi-protocol label switching loopback addresses to the route reflector element.

4. The method of claim 2, wherein advertising the loopback addresses comprises:
   advertising the loopback addresses for non-labeled traffic using an open systems interconnection reference model layer three protocol.

5. The method of claim 1, wherein the core backbone network and the plurality of edge networks are each distinct autonomous systems.

6. The method of claim 1, wherein the interior gateway protocol comprises an open shortest path first routing protocol.

7. The method of claim 6, wherein the core backbone network comprises area zero of the open shortest path first routing domain and the edge networks comprise non-zero areas of the open shortest path first routing domain.

8. The method of claim 1, wherein the loopback addresses have border gateway protocol communities attribute tags associated therewith.

9. The method of claim 8, wherein propagating the advertisement of the loopback addresses to other provider routers of the core backbone network is based on the border gateway protocol communities attribute tags associated with the loopback addresses.

10. The method of claim 8, wherein using the transport route reflector element to advertise the one of the loopback addresses to the service route reflector element in one of the plurality of edge networks is based on border gateway protocol communities attribute tags associated with the loopback addresses and the service.

11. The method of claim 1, wherein the loopback addresses comprise multi-protocol label switching loopback addresses for labeled traffic and loopback addresses for non-labeled traffic and wherein the one of the loopback addresses advertised to the service route reflector element comprises one of the loopback addresses for non-labeled traffic.

12. The method of claim 1, wherein using the transport route reflector element to advertise the one of the loopback addresses to the service route reflector element in one of the plurality of edge networks comprises using the border gateway protocol to advertise the one of the loopback addresses to the service route reflector element.

13. The method of claim 12, wherein the core backbone network and the plurality of edge networks use multi-protocol label switching as a routing protocol and wherein using the transport route reflector element to advertise the one of the loopback addresses to the service route reflector element in one of the plurality of edge networks comprises communicating each of the one of the loopback addresses to the service route reflector element as next hop unchanged.

14. The method of claim 1, wherein the core backbone network uses multi-protocol label switching as a routing protocol, the method further comprising:
receiving an advertisement of a loopback address associated with the service route reflector element at the transport route reflector element; and
propagating the advertisement of the loopback address associated with the service route reflector element to the other provider routers of the core backbone, network as next hop unchanged using the border gateway protocol.

15. The method of claim 14, wherein propagating the advertisement of the loopback address associated with the service route reflector element to the other provider routers of the core backbone network is based on the border gateway protocol communities attribute tags associated with the loopback address associated with the service route reflector element.

16. The method of claim 1, wherein the service comprises one of a virtual private LAN service and a virtual private network.

17. A system, comprising:
a processor; and
a computer readable medium that comprises computer readable program code that when executed by the processor causes the processor to perform operations comprising:
receiving loopback addresses from a plurality of edge networks at a provider router of a core backbone network, the edge networks and the core backbone network being logically distinct from each other;
advertising the loopback addresses to a transport route reflector element;
propagating the advertisement of the loopback addresses to other provider routers of the core backbone network using a protocol for communicating between autonomous systems; and
using the transport route reflector element to advertise one of the loopback addresses to a service route reflector element in one of the plurality of edge networks;
wherein the loopback addresses are not included in routing tables used by an interior gateway protocol for communication within the core backbone network;
wherein the core backbone network and the edge network communicate with one another using the interior gateway protocol; and
wherein the autonomous systems communicate using a border gateway protocol.

18. A computer program product, comprising:
a non-transitory computer readable storage medium having computer readable program code embodied in the medium that when executed by a processor causes the processor to perform operations comprising:
receiving loopback addresses from a plurality of edge networks at a provider router of a core backbone network, the edge networks and the core backbone network being logically distinct from each other;
advertising the loopback addresses to a transport route reflector element;
propagating the advertisement of the loopback addresses to other provider routers of the core backbone network using a protocol for communicating between autonomous systems; and
using the transport route reflector element to advertise one of the loopback addresses to a service route reflector element in one of the plurality of edge networks;
wherein the loopback addresses are not included in routing tables used by an interior gateway protocol for communication within the core backbone network;
wherein the core backbone network and the edge network communicate with one another using the interior gateway protocol; and
wherein the autonomous systems communicate using a border gateway protocol.

* * * * *